(12) United States Patent  
Götz et al.

(10) Patent No.: US 9,081,371 B2  
(45) Date of Patent: *Jul. 14, 2015

(54) METHOD FOR SYNCHRONIZING AN OPERATING CLOCK WITH A TIME CLOCK OF AN AUTOMATION NETWORK

(75) Inventors: Franz-Josef Götz, Heideck (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 255 days.

This patent is subject to a terminal disclaimer.

(21) Appl. No.: 13/542,506

(22) Filed: Jul. 5, 2012

(65) Prior Publication Data

US 2013/0013951 A1    Jan. 10, 2013

(30) Foreign Application Priority Data

Jul. 8, 2011  (EP) .................................... 11173295

(51) Int. Cl.
| | |
|---|---|
| *G06F 1/12* | (2006.01) |
| *G04G 7/00* | (2006.01) |
| *H04J 3/06* | (2006.01) |

(52) U.S. Cl.  
CPC ................ *G04G 7/00* (2013.01); *H04J 3/0638* (2013.01); *H04J 3/0664* (2013.01)

(58) Field of Classification Search  
CPC .................................. G06F 1/12; H04J 3/0638  
USPC ............................................ 375/356; 713/400  
See application file for complete search history.

(56) References Cited

U.S. PATENT DOCUMENTS

| | | | |
|---|---|---|---|
| 6,430,241 B1 | 8/2002 | Rupprecht et al. | |
| 7,012,980 B2 | 3/2006 | Franke et al. | |
| 7,801,258 B2 * | 9/2010 | Narus et al. | 375/356 |
| 8,307,235 B2 * | 11/2012 | Patel et al. | 713/400 |
| 2010/0054282 A1 | 3/2010 | Schirmer et al. | |
| 2011/0150005 A1 | 6/2011 | Chen et al. | |

FOREIGN PATENT DOCUMENTS

| | | |
|---|---|---|
| DE | 10 2005 039771 B3 | 12/2006 |
| DE | 10 2006 013 640 A1 | 9/2007 |
| EP | 1 079 559 | 2/2001 |
| WO | WO 02/075509 | 9/2002 |

* cited by examiner

*Primary Examiner* — Albert Wang  
(74) *Attorney, Agent, or Firm* — Cozen O'Connor

(57) ABSTRACT

A method for synchronizing an operating clock with a time clock in an automation network comprising a plurality of sync slaves that are to be coordinated and a time sync master, wherein the plurality of sync slaves are synchronized with respect to the time clock by the time sync master, and wherein the plurality of sync slaves derive their operating clock from the time clock.

11 Claims, 2 Drawing Sheets

METHOD FOR SYNCHRONIZING AN OPERATING CLOCK WITH A TIME CLOCK OF AN AUTOMATION NETWORK

BACKGROUND OF THE INVENTION

1. Field of the Invention

The invention relates to a method for synchronizing an operating clock with a time clock of an automation network, a device for synchronizing the operating clock with the time clock of the automation network and, more specifically, an entire automation network, a sync slave, and to a computer program product.

2. Description of the Related Art

At least two different conventional sync domains are used for synchronizing components of an automation network with respect to the operating clock and also with respect to the time clock. The existing prior art with respect to operating clock and time clock synchronization of components in a network is a product of the standardized network time protocols:

Institute of Electrical and Electronics Engineers (IEEE) standard 1588v2,
IEEE standard 802.1AS,
Internet Engineering Task Force (IETF) Request for Comment (RFC) "(S)NTP",
International Electrotechnical Commission (IEC) standard 61158 TYPE 10-PTCP.

DE 10 2005 039771 B3 discloses a unit and a method for managing realtime processes without asynchronous interruptions.

US 2011/0150005 A1 discloses a method for time synchronization of slaves of a network using a network protocol similar to the Precision Time Protocol (PTP).

WO 02/075509 A2 discloses a method and a system for synchronizing a networked communication system with respect to a communication clock by a relative clock time.

EP 1 079 559 A2 discloses a method and an arrangement for synchronizing system units, where the operating clocks of system units interconnected in particular by an asynchronously transmitting connection can be synchronized over the connection.

SUMMARY OF THE INVENTION

It is an object of the present invention to provide an improved method for synchronizing the operating clock with the time clock of sync slaves of an automation network, an improved device for simultaneously synchronizing the operating clock with the time clock of the sync slaves of the automation network, and an entire automation network, and a sync slave, as well as an improved computer program product.

These and other objects and advantages are achieved in accordance with the invention by a method for synchronizing the operating clock with the time clock of an automation network, comprising a number of sync slaves that are to be coordinated and a time sync master, where the sync slaves are synchronized with respect to the time clock by the time sync master, and where the sync slaves derive their operating clock from the time clock.

The generally valid clock time, such as the International Atomic Time (TAI), is therefore communicated, e.g., by a time sync master of an automation network, to the individual sync slaves by means of a synchronization message, where each individual sync slave of the automation network adopts the clock time or, as the case may be, time clock of the time sync master and each individual sync slave derives its operating clock from the time clock in accordance with a defined rule. This means e.g., that the respective local system time of each sync slave is synchronized with the globally specified generally valid clock time of the time sync master, although a direct operating clock synchronization is dispensed with because the operating clock is derived from the time clock.

The synchronization message thus contains only information relating to the clock time specified by the time sync master, but no information relating to the operating clock. This has the advantage that only a single synchronization message is required for synchronizing components of an automation network both with respect to the time clock and with respect to the operating clock, and consequently also that only a single sync domain is necessary. A further advantage resulting from this is a reduction in networking complexity and a reduced requirement for additional hardware, which ultimately leads to cost savings.

A sync domain in this context represents a group of sync slaves that are subordinate to a higher-ranking time or clock sync master and comply with the time sync master with respect to the time and the clock sync master with respect to the operating clock.

A sync slave in the present context is understood to mean an automation component that is coordinated with respect to the time clock and the operating clock by a higher-ranking time and clock sync master, respectively. The function of a time sync master of an automation network lies, e.g., in the time coordination of the automation components of a technical installation. As the higher-ranking network component, a clock sync master takes on responsibility for the synchronization of the individual application components with respect to the operating clock.

In an embodiment, an automation network is configured, e.g., as an industrial automation network. Such industrial automation networks can be configured and/or provided, e.g., for open- and/or closed-loop control of industrial facilities (e.g., production plants or conveyor systems), machinery and/or equipment. Automation networks or industrial automation networks can have in particular realtime communication protocols (e.g., Profinet, Profibus, Real-Time Ethernet) for communicating at least between the components involved in the open- and/or closed-loop control functions (e.g., between the control units and the plants and/or machines to be controlled). The secure transmission of data by a storage media is likewise covered.

In addition to a realtime communication protocol, however, at least one further communication protocol (which, e.g., does not need to be realtime-capable) can also be provided in the automation network or industrial automation network, e.g., for monitoring, configuring, reprogramming and/or reparameterizing one or more control units in the automation network.

An automation network can include, e.g., hardwired communication components and/or wireless communication components. An automation network can also include at least one automation device.

An automation device can be, for example, a computer, PC and/or controller having control functions or control capabilities. In particular, an automation device can be, for example, an industrial automation device which can be configured and/or provided, e.g., specifically for open- and/or closed-loop control of industrial facilities. Such automation devices or industrial automation devices can in particular be realtime-capable, i.e., support open- and/or closed-loop control in realtime. Toward that end, the automation device or industrial automation device can include, e.g., a realtime operating system and/or support, at least inter alia, a realtime-capable communication protocol for communication purposes (e.g., Profinet, Profibus, Real-Time Ethernet).

An automation network comprises a plurality of sensors and actuators. The actuators and sensors are controlled by at least one control device. The actuators, the sensors and the at least one control device exchange data with one another. An automation protocol is used for the data exchange. The at least one control device controls the actuators, the sensors and the data exchange such that an automatic manufacturing process is executed in which, e.g., a product is manufactured.

An industrial automation device can be, e.g., a programmable logic controller, a module or part of a programmable logic controller, a programmable logic controller integrated in a computer or PC, as well as corresponding field devices, sensors and/or actuators, input and/or output devices or the like for connecting to a programmable logic controller or can comprise such devices.

An automation protocol, within the meaning of the present invention, is understood to denote any type of protocol that is provided, suitable and/or configured for the purpose of communicating with automation devices in accordance with the present description. Such automation protocols can be, for example, the PROFIBUS protocol (e.g., conforming to IEC 61158), a PROFIBUS-DP protocol, a PROFIBUS-PA protocol, a PROFINET protocol, a PROFINET-IO protocol, a protocol conforming to AS-Interface, a protocol conforming to IO-Link, a KNX protocol, a protocol conforming to a multipoint interface (MPI), a protocol for a point-to-point (PtP) link, a protocol conforming to the S7 communication specifications (which is provided and configured, for example, to support communication by programmable logic controllers of the company Siemens) or also an Industrial Ethernet protocol or Real-Time Ethernet protocol or, as the case may be, further specific protocols for communication with automation devices. Any combinations of the aforementioned protocols can also be provided as an automation protocol within the meaning of the present description.

In accordance with an embodiment the invention, the sync slaves always derive the operating clock at a predefined instant in time, where the time clock is given by a periodic time function, where the time instant is defined by a periodically recurring reference point of the periodic function. In other words, a specific recurring reference point of the periodic time function of the time clock is defined at which the sync slaves derive their operating clock. The advantage lies in the fact that the sync slaves require only the information relating to the clock time specified by the time sync master or to the time clock in order to derive their operating clock, but do not require any information relating to the difference between operating clock and time clock.

In accordance with another embodiment of the invention, the periodically recurring reference point is a zero crossing of the periodic function. If, for example, it is defined as a rule that the operating clock of the sync slaves always starts in the zero crossing (where, e.g., the "hands" stand at 0 sec and 0 ns) of the local system clock, it is not necessary to transmit information relating to the difference between the operating clock and the time clock in the synchronization message. This has the advantage that henceforth all sync slaves only need to be synchronized with respect to the clock time, which means that the networking complexity and the requirement for additional hardware components are reduced. The use of the zero crossing furthermore has the advantage that it is here that usually the greatest change in the periodic function occurs, with the result that this reference point can be determined in a precise manner. A periodic function can be, e.g., a sine function, a rectangular function or a triangular function. However, other suitable periodic functions are also possible.

In accordance with an embodiment of the invention, an adjustment of the frequency of the time clock of the sync slaves to the time clock of the time sync master occurs, with the result that the clock error between sync slaves and time sync master is minimized. The sync slaves can therefore effectively take over the frequency of the time clock of the higher-ranking time sync master. This means that the differences between the proprietary oscillation frequencies of each individual sync slave and of the time sync master can be eliminated to a substantial degree.

The difference between the time clocks of the clock sync master and/or the time sync master and the time clocks of the individual sync slaves comes about because the system-inherent quartz crystals of the individual components have different proprietary oscillation frequencies. This results in each case in a clock error in the nanosecond range, i.e., initially the system clocks of the individual components of the automation network do not run in synchronism.

The advantage of the presently contemplated embodiment of the invention lies in the fact that as a result of the "rate compensation" approximated effectively to zero, all the automation components of the automation network use the same clock time as reference time and consequently a standardized rule for triggering a restart of an operating cycle can be defined.

In accordance with yet another embodiment of the invention, the adjustment of the frequency occurs locally for each sync slave. This means that in every single sync slave the proprietary oscillation frequency of the quartz crystal inherent in the system is adjusted in an individual manner to the clock time specified by the time sync master or to the specified time clock. This has the advantage that an optimization of the adjustment method with respect to the oscillation frequency can be achieved locally in each sync slave. The frequency adjustment of each individual sync slave occurs in each case independently of the frequency adjustment processes of the other sync slaves in the automation network. The frequency adjustment of each individual sync slave is accordingly controlled locally for each individual automation component and independently of the adjustment processes of the other automation components.

In accordance with another embodiment of the invention, the method is performed in a fieldbus system. In this context, a fieldbus interconnects the automation components in an automation plant for communication with a controller device. Implementing the method in a fieldbus system affords the advantage that it is explicitly defined which network component will communicate a specific piece of information to the other network components at a specific instant in time. The role allocation of time sync master, clock sync master and sync slaves is therefore permanently predefined right from the outset.

Furthermore, the use of fieldbus technology removes the need for parallel wiring of binary signals as well as analog signal transmission. Moreover, the serial networking of the components in the field domain of a fieldbus system is also substantially more favorable in terms of cost, because the fieldbus replaces the parallel circuit groups with a single bus cable and at the same time connects all levels, from field level to control level. Deploying a fieldbus system also achieves a higher level of reliability and better availability by virtue of short signal paths. Moreover, self-diagnosis by the fieldbus system with plaintext display undoubtedly shortens downtimes and maintenance times. Extensions or changes to the fieldbus system are easy to implement and guarantee flexibility and long-term serviceability.

In accordance with a further embodiment of the invention, the sync slave is synchronized with respect to the time clock by a time sync master, where the sync slave derives its operating clock from the time clock. Every single sync slave of the automation network therefore possesses the capability to derive its individual operating clock from the time clock specified by the time sync master in accordance with a defined rule. Thus, for example, the local system time of a sync slave, previously adjusted to the clock time of the time sync master by a synchronization message, can serve as the basis for the derivation of the operating clock of the individual sync slave. This implies, e.g., the advantage that in the case of a localized and individual derivation of the operating clock in the sync slave from the local, previously synchronized time clock of the sync slave, a replication and accumulation of errors is effectively ruled out, thereby avoiding a propagation of errors in the automation network.

In a still further embodiment of the invention, the derivation of the operating clock from the time clock entails the use of a single synchronization message, where the synchronization message is communicated between a clock sync master and the sync slaves, where the clock sync master is superior in rank to the sync slaves and provides a master clock, where the method includes using the synchronization message to communicate a difference between the time clock and the master clock, where said difference is incorporated as additional information in the synchronization message, and where the operating clock is derived from the difference and the time clock.

It is made possible by the presently disclosed embodiment for, e.g., the clock time that is provided by the time sync master to be adjusted without the operating clock being altered as a consequence, e.g., without abrupt changes occurring in the operating clock. An example of this is the changeover between summertime and wintertime, in which the time sync master effects a time adjustment by 1 hour. The transmission of the difference results in this information "time adjusted by 1 hour" being communicated to the sync slaves by additional information in the synchronization message, though without the operating clock of the sync slaves being affected by this change.

It is also an object of the invention to provide an automation network having a synchronized operating clock and time clock, where automation network comprises a number of sync slaves that are to be coordinated and a time sync master, where the sync slaves can be synchronized with respect to the time clock by a time sync master, and where the sync slaves are configured to derive their operating clock from the time clock.

It is also an object to provide a sync slave for synchronizing the operating clock and time clock in an automation network, where the sync slave is synchronizeable with respect to the time clock by a time sync master, and where the sync slave is configured to derive its operating clock from the time clock.

It is also another object of the invention to provide a computer program product comprising instructions that are executable by a processor for the purpose of performing the above-described method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiment variants of the invention are explained in more detail below with reference to the following drawings, in which.

DETAILED DESCRIPTION OF THE PREFERRED EMBODIMENTS

Figure 1:
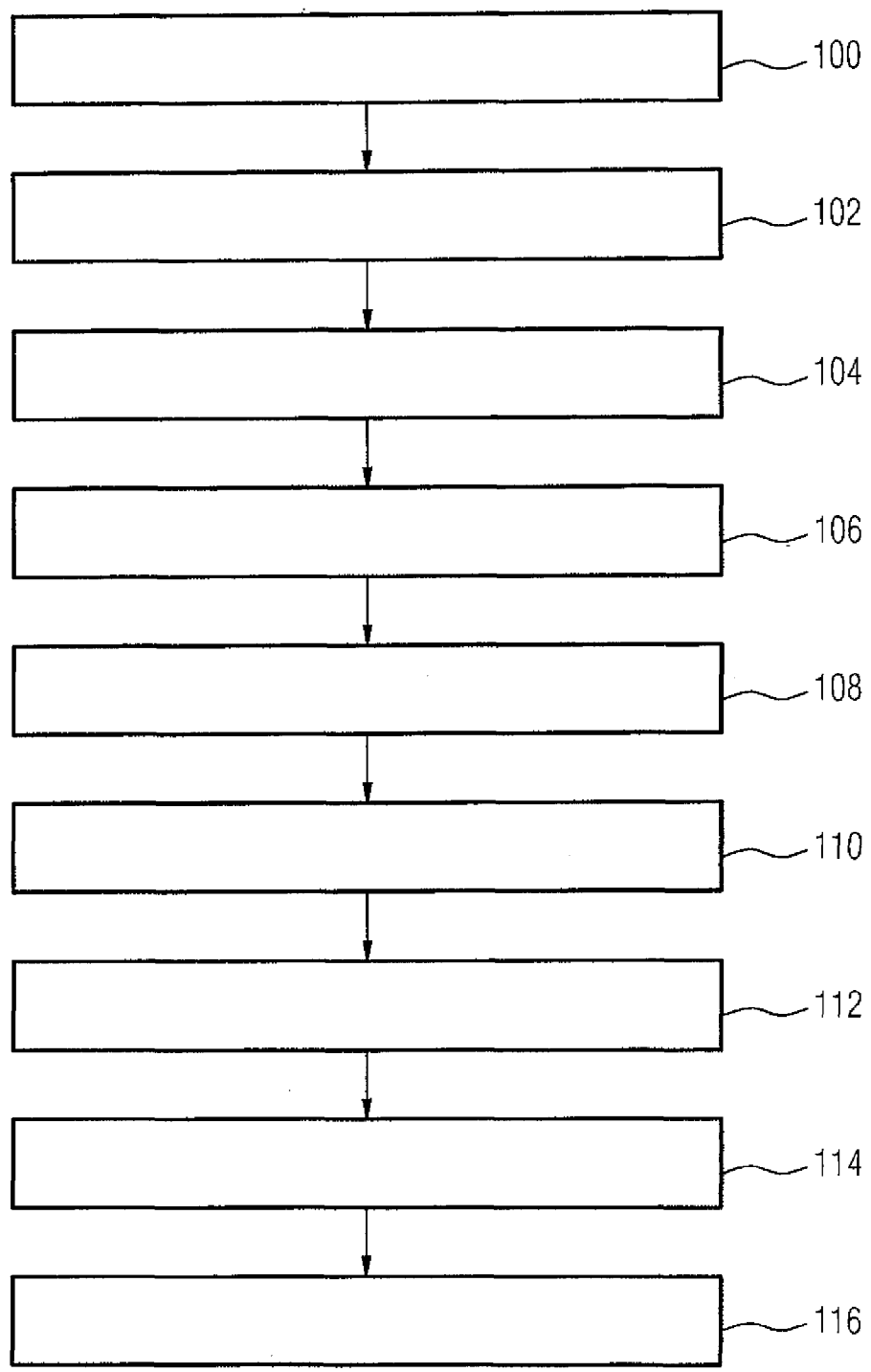
FIG. 1 shows a flowchart of the method for synchronizing the operating clock with the time clock of an automation network in accordance with an embodiment of the invention.

FIG. 1 shows a block diagram of a flowchart of the method for synchronizing the operating clock with the time clock of an automation network in accordance with an embodiment of the invention. In step 100, the time sync master derives its operating clock from the generally valid clock time. In step 102, the time sync master then sends a synchronization message to communicate the externally specified clock time to the first sync slave in the automation network.

In step 104, the sync slave adopts the clock time or time clock sent by the time sync master by a synchronization message, with the result that the local system time of the sync slave now matches the externally specified clock time. In step 106, the sync slave now derives its operating clock from the adjusted local system time or the adjusted time clock. In step 108, the sync slave forwards the clock time or time clock sent by the time sync master to the next sync slave by a synchronization message.

In step 110, the next sync slave adopts the unchanged external clock time specified by the time sync master or the unchanged time clock of the time sync master as its own system time or its own time clock. In step 112, the sync slave now determines its operating clock from the adjusted local system time or time clock.

In step 114, the sync slave forwards the clock time specified by the time sync master to the next sync slaves by a synchronization message. In step 116, each sync slave in the automation network adjusts its local system time to the external clock time specified by the time sync master and uses the adjusted system time as a reference for deriving its respective operating clock.

Figure 2:
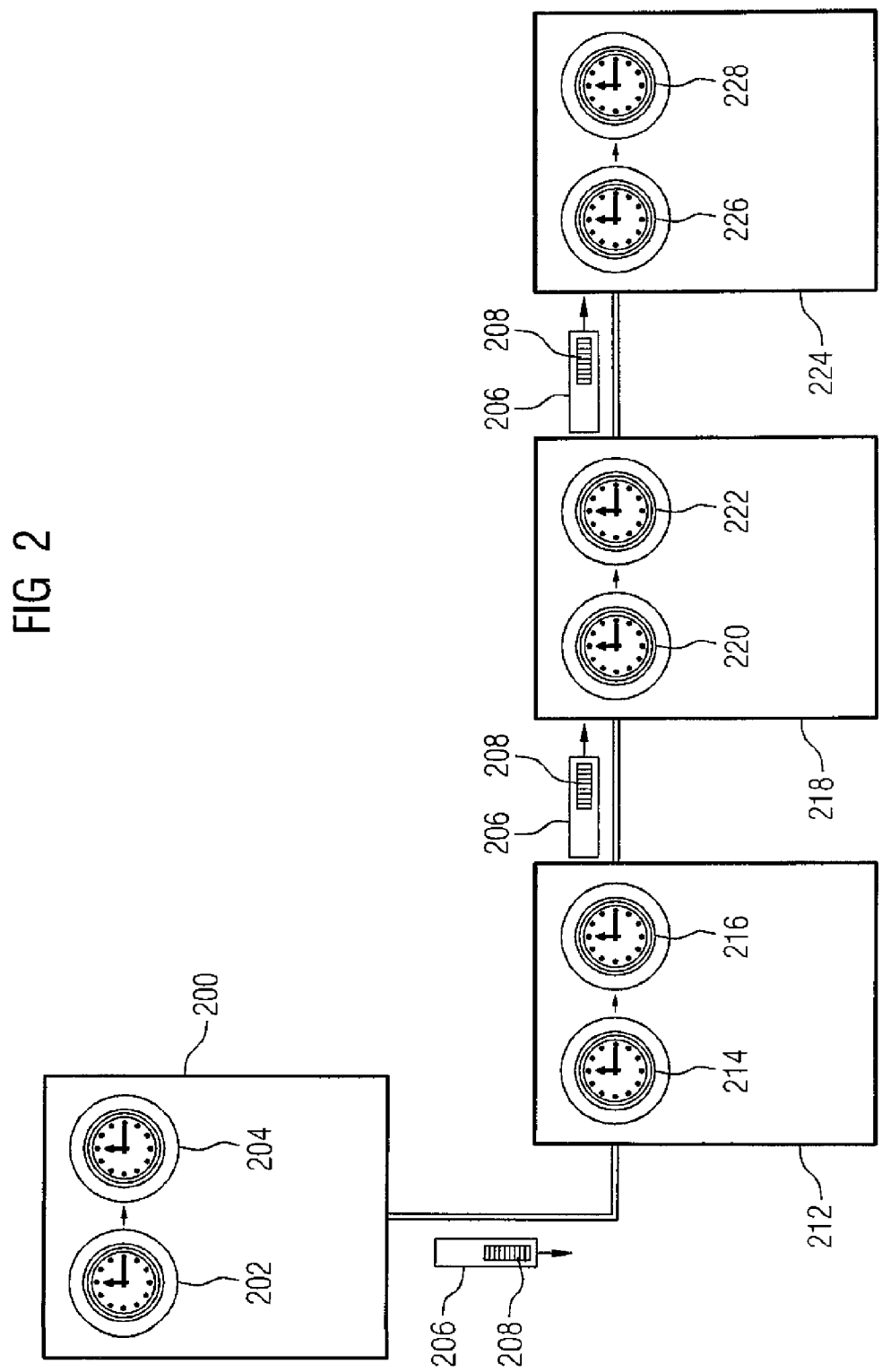
FIG. 2 shows a schematic block diagram for illustrating the method and the device for operating clock and time clock synchronization in an automation network in accordance with the invention.

FIG. 2 shows a schematic block diagram containing the components of an automation network, where the time sync master 200 provides a clock time which can, for example, represent the generally valid clock time, such as the International Atomic Time (TAI), as local system time 202. The time sync master 200 derives its operating clock 204 from the clock time 202 in step 100. The time sync master 200 sends a synchronization message 206 containing information relating to the generally valid clock time 208 to the next sync slave 212 in step 102.

The sync slave 212 accepts the clock time 208 sent by the time sync master 200 as its own local system time 214 and derives its operating clock 216 from the adjusted time clock 214 in step 106. The sync slave 212 forwards the clock time 208 communicated by the time sync master 200 unchanged to the next sync slave 218 by a synchronization message 206.

In step 110, the sync slave 218 likewise accepts the clock time 208 initially sent by the time sync master 200 as its own local system time 220. The sync slave 218 determines its operating clock 222 from said adjusted local system time in step 112. In step 114, the sync slave 218 forwards the clock time 208 unchanged to the next sync slave 224 by means of a synchronization message 206.

In step 116, the sync slave 224 accepts the clock time 208 unchanged as its own local system time 226 and from this derives its operating clock 228.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for synchronizing an operating clock with a time clock of an automation network comprising a plurality of sync slaves that are to be coordinated and a time sync master, wherein the plurality of sync slaves are synchronized with respect to the time clock by the time sync master, comprising:
    deriving, by each of the plurality of sync slaves, a respective operating clock from a time clock of each of the plurality of sync slaves;
    deriving each operating clock of the plurality of sync slaves at a predefined instant in time, the time clock of each of the plurality of sync slaves being given by a periodic time function, the predefined instant in time being defined by a periodically recurring reference point of the periodic function such that only a single synchronization message is required to synchronize each of the plurality of sync slaves of the automation network both with respect to the time clock of each of the plurality of sync slaves and with respect to the operating clock and consequently also that only the single sync domain is necessary; and
    deriving an operating clock of the time sync master from a time clock of the time sync master based on the single synchronization message.

2. The method as claimed in claim 1, wherein the periodically recurring reference point is a zero crossing of the periodic function.

3. The method as claimed in claim 1, further comprising:
    adjusting a frequency of the time clock of each of the plurality of sync slaves to the time clock of the time sync master such that a clock error between each of the plurality of sync slaves and the time sync master is minimized.

4. The method as claimed in claim 3, wherein the adjustment of the frequency occurs locally for each sync slave of the plurality of sync slaves.

5. The method as claimed in claim 1, wherein the method is performed in a fieldbus system.

6. A method for synchronizing an operating clock with a time clock of a sync slave in an automation network, comprising:
    providing a time sync master for synchronizing the sync slave with respect to a time clock of the time sync master;
    deriving, by each of the plurality of sync slaves, an operating clock of each of the plurality of sync slaves from a time clock of each of the plurality of sync slaves; and
    deriving an operating clock of the time sync master from the time clock of the time sync master based on a single synchronization message;
    wherein the operating clock of each of the plurality of sync slaves is always derived at a predefined instant in time;
    wherein the time clock of each of the plurality of sync slaves is given by a periodic time function; and
    wherein the predefined instant in time is defined by a periodically recurring reference point of the periodic function.

7. The method as claimed in claim 1, further comprising:
    communicating the synchronization message between a clock sync master and the sync slaves, the clock sync master being superior in rank to the plurality of sync slaves and provides a master clock;
    communicating a difference between the time clock and the master clock using the synchronization message; and
    incorporating the difference as additional information in the synchronization message; and
    deriving the operating clock from the difference and the time clock.

8. A non-transitory computer program product encoded with a computer program executed by a processor that causes synchronization of an operating clock with a time clock of a sync slave in an automation network comprising a plurality of sync slaves that are to be coordinated and a time sync master, wherein the plurality of sync slaves are synchronized with respect to the time clock by the time sync master, the computer program comprising:
    program code for deriving, by each of the plurality of sync slaves, a respective operating clock from a time clock of each of the plurality of sync slaves;
    program code for deriving each operating clock of the plurality of sync slaves at a predefined instant in time, a time clock of the time sync master being given by a periodic time function, a time instant being defined by a periodically recurring reference point of the periodic function such that only a single synchronization message is required to synchronize each of the plurality of sync slaves of the automation network both with respect to the time clock of the plurality of sync slaves and with respect to the operating clock of the plurality of sync slaves and consequently also that only the single sync domain is necessary; and
    program code for deriving an operating clock of the time sync master from a time clock of the time sync master based on the single synchronization message.

9. A non-transitory computer program product encoded with a computer program executed by a processor that causes synchronization of an operating clock with a time clock of a sync slave in an automation network, the computer program comprising:
    program code for providing a time sync master for synchronizing the sync slave with respect to a time clock of the time sync master;

program code for deriving, by each of the plurality of sync slaves, an operating clock of each of the plurality of sync slaves from a time clock of each of the plurality of sync slaves; and program code for deriving an operating clock of the time sync master from the time clock of the time sync master based on a single synchronization message;

wherein the operating clock of each of the plurality of sync slaves is always derived at a predefined instant in time;

wherein the time clock of each of the plurality of sync slaves being given by a periodic time function; and wherein the predefined instant in time is defined by a periodically recurring reference point of the periodic function.

10. An automation network having operating clock and time clock synchronization, comprising:

a plurality of sync slaves that are to be coordinated and a time sync master;

wherein the plurality of sync slaves are synchronizeable with respect to a time clock of the time sync master;

wherein each of the plurality of sync slaves are configured to derive the operating clock of each of the plurality of sync slaves from the time clock of each of the plurality of sync slaves;

wherein the operating clock of the plurality of sync slaves sync slaves is always derived at a predefined instant in time;

wherein the time clock of the time sync master is given by a periodic time function;

wherein the time instant is defined by a periodically recurring reference point of the periodic function; and wherein an operating clock of the time sync master is derived from the time clock of the time sync master based on a single synchronization message.

11. A sync slave for operating clock and time clock synchronization in an automation network, wherein the sync slave is synchronizeable with respect to a time clock of a time sync master, wherein the sync slave is configured to derive an operating clock of the sync slave from the time clock of the sync slave, wherein the operating clock of the sync slave is always derived at a predefined instant in time, wherein the time clock is given by a periodic time function, and wherein the predetermined instant in time is defined by a periodically recurring reference point of the periodic function, and wherein an operating clock of the time sync master is derived from the time clock of the time sync master based on a single synchronization message.

* * * * *